July 9, 1963 W. A. SMITH 3,096,564
TURRET LATHE TOOLING
Filed Aug. 22, 1960 3 Sheets-Sheet 1

INVENTOR.
William A. Smith,
BY Parker & Carter
Attorneys.

July 9, 1963

W. A. SMITH 3,096,564

TURRET LATHE TOOLING

Filed Aug. 22, 1960

INVENTOR.
William A. Smith,
BY Parker & Carter
Attorneys.

# United States Patent Office 3,096,564
Patented July 9, 1963

3,096,564
TURRET LATHE TOOLING
William A. Smith, Peru, Ind., assignor to Logansport Machine Co., Inc., Logansport, Ind., a corporation of Indiana
Filed Aug. 22, 1960, Ser. No. 50,956
8 Claims. (Cl. 29—57)

This invention relates to tool holding slide for hex turret lathes and has for one object to make it possible to mount on one face of the turret a plurality of tools and to so manipulate them that without turning movement of the turret two or more tools may be presented to the work.

Another object is to provide in combination with a turret lathe where normally a single tool on each face of the turret is presented to the work, means to present a plurality of tools.

I propose to mount on the face of the turret a cross head guide which will support and permit lateral movement of a tool carrying slide together with means associated therewith for moving the slide into and holding it in a plurality of tool presenting positions. For convenience, I propose to use a hydraulic mechanism for positioning of the tool.

Other objects will appear from time to time throughout the specification and claims.

My invention is illustrated more or less diagrammatically in the accompanying drawings, wherein—

Like parts are indicated by like numerals throughout the specification and drawings.

Figure 1:
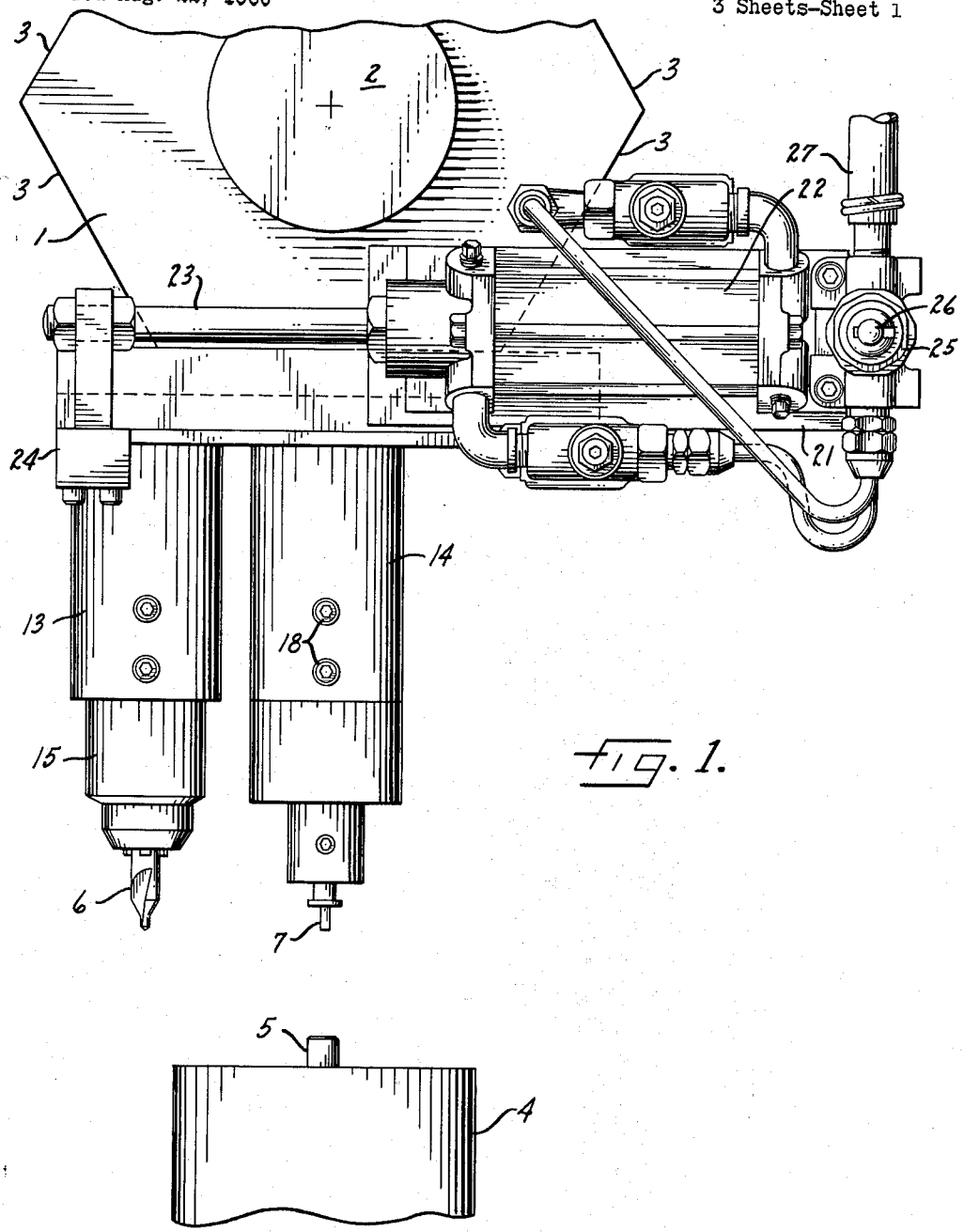
FIGURE 1 is a top plan view of a lathe turret mounting a tool holding unit.
Figure 2:
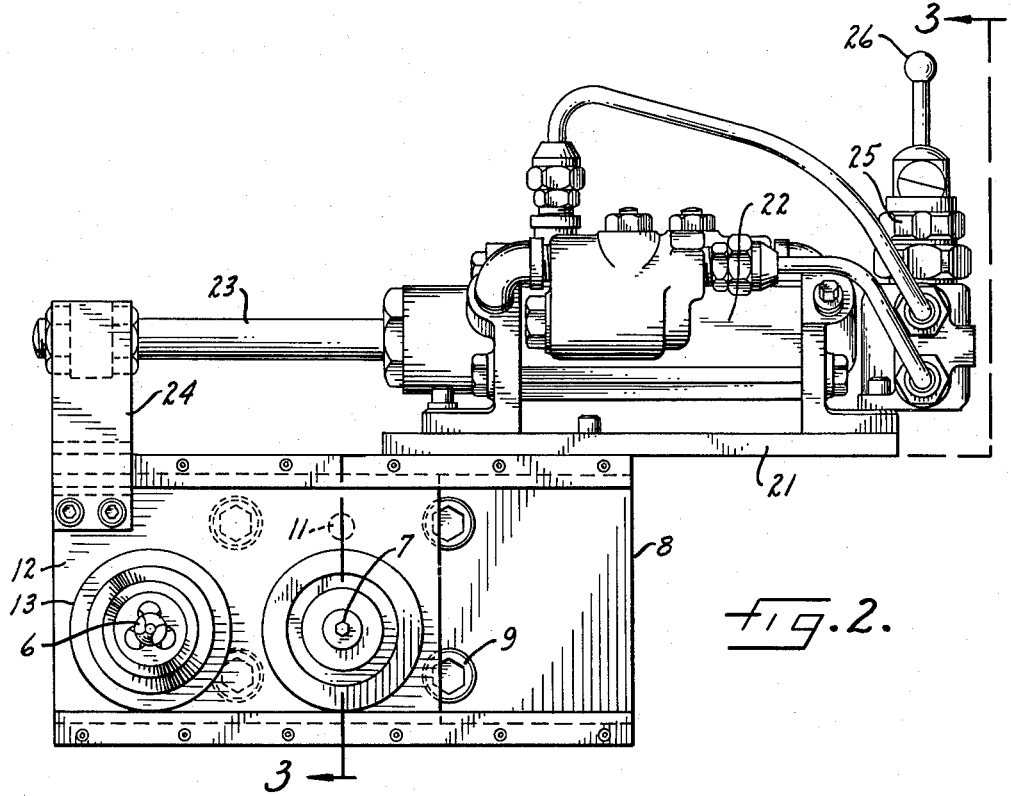
FIGURE 2 is a front view of the tool slide mounted on the turret.
Figure 3:
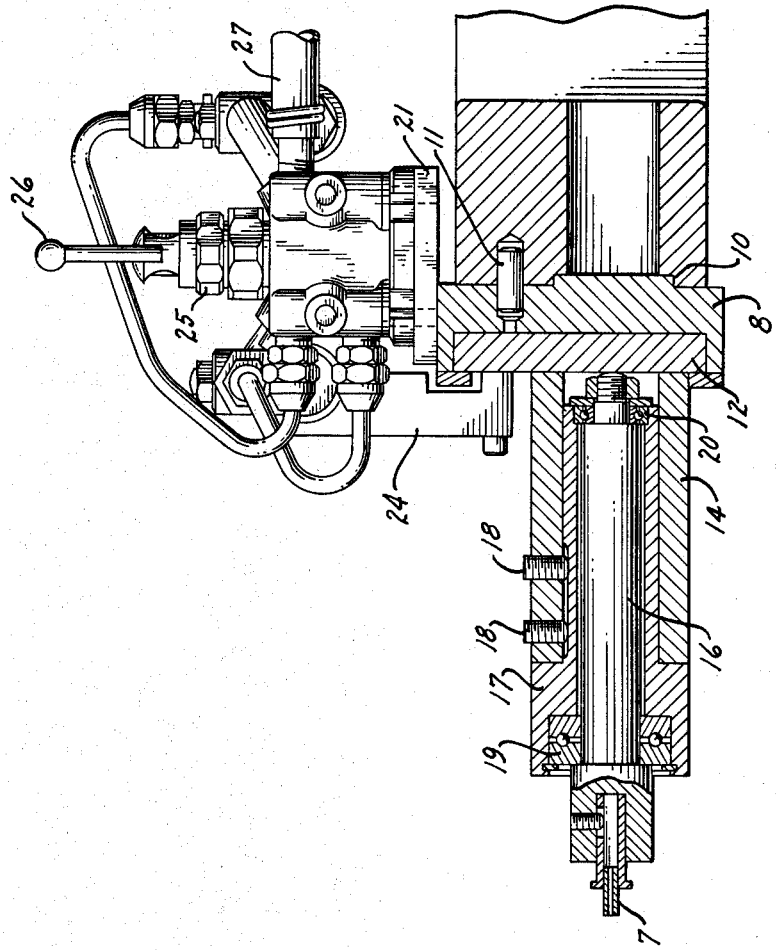
FIGURE 3 is a section along the line 3—3 of FIGURE 2.
Figure 3:
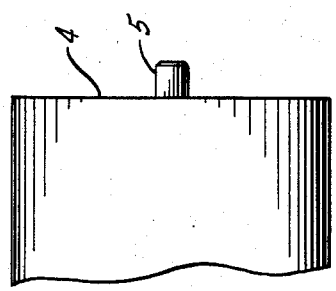

A lathe turret 1 is mounted for rotation on a stud 2, on a turret lathe, the details of which forming no part of the invention are not illustrated. Suffice it to say the turret has a plurality of faces 3. I have illustrated it as a hex turret but it might have a different number of faces. The chuck 4 carries the work 5 and presents it to one or other of the cutting tools 6 and 7. For convenience, I have shown the cutting tool 6 as a countersink held against rotation, the tool 7 as a broach and free to rotate.

A cross head guide 8 is held against the turret by cap screws 9. A pilot boss 10 is socketed in the face of the turret and that together with the dowel pin 11 insures fixed positioning of the cross head guide 8. A slide 12 is reciprocably mounted on the cross head guide 8 and projecting forwardly from this slide, rigidly mounted thereon, are tool carrying sleeves 13 and 14. A chuck 15 in the sleeve 13 holds the drill against rotation. The broach 7 is rotatably mounted on a spindle 16 which rotates in the sleeve 17, held in place in the sleeve 14 by set screws 18, the spindle 16 being supported by bearings 19 and 20 so that when the broach is presented to the work it is free to rotate with it whereas the drill is held against rotation for filling. Thus there are two tools which by longitudinal movement of the tool slide 12 may be presented selectively to the work.

Mounted on the cross head guide 8 is a platform 21 which carries a hydraulic cylinder 22. Projecting from the cylinder is a piston rod 23 attached to a bracket 24 on the tool slide 12 so that actuation of the piston in the hydraulic cylinder through piston rod 23 and bracket 24 is available to move the tool slide 12 back and forth.

A four-way two position toggle 25 is operated or valve controlled by a lever 26. It controls pneumatic pressure received from any suitable source through a duct 27 to actuate the air cylinder in the usual way. This apparatus is conventional, its details are not illustrated. Suffice it to say that in accordance with the usual practice, manipulation of the lever 26 may be used to move the piston in the air cylinder back and forth. At one end of the excursion, the tool 6 is presented to the work. At the other end of the excursion, the tool 7 is presented to the work and this movement of the tools and presenting of one or other of the tools to the work may take place without any movement of the turret so that, for example, after drill 6 has drilled the end of the work 5, the work and tool may be separated, the air cylinder may be then operated, the broach will be moved to the left in line with the work and the tool and work will again be brought together. This takes place without any stoppage of drive of the work and without any change in or operation of the turret.

The use and operation of my invention are as follows:

Shown and described herein is an improvement in turret lathe tooling. The lathe structure has not been shown and any conventional turret lathe may be used with the improved tool holding unit disclosed. It is conventional in turret lathes to have a different tool positioned on each of the faces of the turret. The turret is rotatable so that the operator may quickly change from one tool to another. However, in many cases it is quite advantageous to have two or more tools positioned on the same face of the turret which may be sequentially used in machining a particular part so that the turret does not have to be rotated in order to change from one tool to another. I have positioned two such tools on a slide which is moved back and forth across the work station by suitable power means for example, an air cylinder. The slide may move up and down or sidewise as desired.

The slide may be mounted on a cross head guide which supports the slide for back and forth movement. The air cylinder is mounted on top of the cross head guide and includes a piston which is attached through a bracket or the like to the slide and provides the power for moving the slide. The air cylinder structure may include a suitable switch or control lever which directs the flow of air pressure to the cylinder and hence controls the operation of the slide.

Whereas the preferred form of the invention has been shown and described herein, it should be realized that there are many modifications, substitutions and alterations thereto which may be made without departing materially from the spirit of my invention. I wish, therefore, that my showing be taken as in a large sense diagrammatic and not limiting me to the precise showing.

I claim:

1. A tool holding unit for a rotatable lathe turret including a tool slide adapted to be moveably mounted on one face of said turret, a plurality of tools spacedly mounted on said slide, and fluid pressure means for moving said slide back and forth along a path tangent to the axis of rotation of said turret so that a single tool will be positioned at a work station at a time.

2. A lathe turret adapted to be rotatably mounted on a lathe such that only one face of the turret will be positioned at a work station at a time, a tool slide moveably mounted on one face of said turret, a pair of tools spacedly mounted on said slide, most of the remaining faces of said turret each having at least one tool mounted thereon, and power means for moving said slide back and forth such that only one of said pair of tools is positioned at said work station at a time.

3. The structure of claim 2 further characterized by a sleeve supporting each of said tools on said slide, and a spindle mounted within each of said sleeves.

4. A tool holding unit for use on a rotatable lathe turret including a guide member adapted to be mounted on one face of said turret, a tool slide slidably mounted on said guide member, a pair of cutting tools, means for mounting said cutting tools in spaced relation on said slide, and power means for moving said slide back and forth so that either one or the other of said tools is positioned at a work station.

5. The structure of claim 4 further characterized in that the means for mounting said tools on said slide include a cylindrical support member and a sleeve having a portion thereof extending within said support member, a spindle rotatably mounted within said sleeve and carrying a cutting tool at the end thereof, bearing means interposed between said sleeve and said spindle, and means for preventing rotation of said spindle.

6. The structure of claim 4 further characterized by means for aligning said guide member on said hex turret in both the vertical and horizontal directions.

7. The structure of claim 4 further characterized by an air cylinder positioned on said guide member and effective to move said slide.

8. The structure of claim 7 further characterized by a piston reciprocal by said air cylinder and connected to said slide to effectively move said slide back and forth in a direction tangent to the axis of rotation of said hex turret.

References Cited in the file of this patent

UNITED STATES PATENTS

| | | |
|---|---|---|
| 895,788 | Potter | Aug. 11, 1908 |
| 1,038,242 | Vogel | Sept. 10, 1912 |
| 2,459,235 | Tornex | Nov. 16, 1948 |
| 2,529,753 | Williams | Nov. 14, 1950 |
| 2,644,999 | Hill | July 14, 1953 |